United States Patent Office 3,462,438
Patented Aug. 19, 1969

3,462,438
1,2,2α,8β-TETRAHYDROCYCLOBUTA[c]
QUINOLINES
Bernard Loev, Broomall, Pa., assignor to Smith Kline &
French Laboratories, Philadelphia, Pa., a corporation
of Pennsylvania
No Drawing. Continuation-in-part of application Ser. No.
545,254, Apr. 26, 1966. This application Oct. 16, 1967,
Ser. No. 675,310
Int. Cl. C07d 33/30, 39/00, 57/00
U.S. Cl. 260—287                              7 Claims

ABSTRACT OF THE DISCLOSURE 1,2,2a,8b - tetrahydrocyclobuta[c]quinolines which are prepared by the photochemical reaction of a carbostyril (or thiocarbostyril) with an unsaturated compound have pharmacodynamic activity, more particularly analgesic, central nervous system depressant, hypotensive and diuretic activity.

This application is a continuation-in-part of Ser. No. 545,245 filed Apr. 26, 1966 now abandoned.

This invention relates to new compounds having the 1,2,2a,8b - tetrahydrocyclobuta[c]quinoline ring system and to a process for preparing these compounds.

Compounds of this invention having pharmacodynamic activity are represented by the following formula:

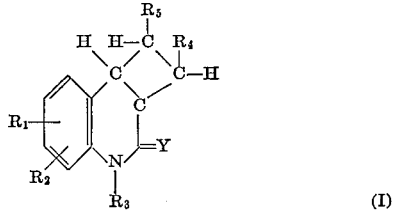

(I)

when:
Y is oxygen or sulfur;
$R_1$ is hydrogen, halogen, trifluoromethyl, lower alkyl, lower alkoxy, hydroxy, nitro, amino, mono-lower alkylamino, di-lower alkylamino, lower alkanoylamino, lower alkoxycarbonyl, carboxy, carbamoyl or sulfamoyl;
$R_2$ is hydrogen, halogen, hydroxy, lower alkoxy or, when taken together with $R_1$ and when adjacent to $R_1$, methylenedioxy;
$R_3$ is hydrogen, lower alkyl, di-lower alkylamino-lower alkylene, hydroxy or lower alkoxy; and
$R_4$ and $R_5$ are hydrogen or, taken together with the carbon atoms to which they are attached, form a cycloalkyl ring having 5–6 members or a saturated heterocyclic ring having 5–6 members of which one member is a nitrogen atom having a lower alkyl substituent and the other members are carbon.

The compounds of Formula I in which $R_4$ and $R_5$ are hydrogen, have central nervous system depressant activity as demonstrated, for example, by decrease in motor activity in mice after administration of 25 to 200 mg./kg. orally. These compounds also have analgesic activity as shown, for example, in the D'Amour-Smith test in rats at doses of 25 mg./kg. orally.

The compounds of Formula I in which $R_4$ and $R_5$, taken together with the carbon atoms to which they are attached, form a cycloalkyl ring having 5–6 members or a saturated heterocyclic ring having 5–6 members of which one member is a nitrogen atom having a lower alkyl substituent and the other members are carbon, have hypotensive activity as demonstrated, for example, by administration to anesthetized dogs at doses of 0.5 to 10 mg./kg. intravenously. These compounds also have diuretic activity as shown, for example, in tests in anesthetized phosphate mannitol infused dogs at doses of 0.90 to 4.5 mg./kg. intravenously.

Advantageous compounds of this invention are represented by Formula I when Y is oxygen; $R_1$ is hydrogen, chloro or trifluoromethyl; $R_2$ is hydrogen; and $R_3$ is lower alkyl.

A preferred compound of Formula I is 1,2,2a,8b-tetrahydro-4-methyl - 7 - trifluoromethylcyclobuta[c]quinolin-3(4H)-one which is represented by the following formula:

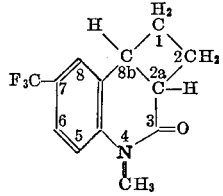

Also included in this invention are the compounds represented by the following Formula II which are intermediates for preparing the pharmacologically active compounds of Formula I:

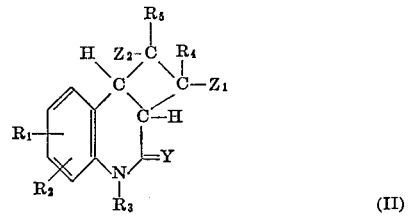

(II)

when:
Y and $R_1$–$R_5$ are as defined as in Formula I;
$Z_1$ is hydrogen or

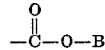

$Z_2$ is hydrogen or

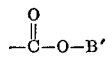

or $Z_1$ and $Z_2$, taken together with the carbon atoms to which they are attached, form an N-lower alkylmaleimide ring, at least one of $Z_1$ and $Z_2$ being other than hydrogen; and
B and B' are the same and are hydrogen or lower alkyl.

The compounds of Formula I are prepared from the compounds of Formula II by decarboxylating the carboxy compounds, or saponifying the lower alkoxycarbonyl compounds and decarboxylating.

In addition, this invention relates to benzyl intermediates which are represented by Formulas I and II when $R_3$ is benzyl. These benzyl compounds are useful as intermediates in the preparation of the corresponding cyclobuta[c]quinolines in which $R_3$ is hydrogen as is described herebelow.

The terms "lower alkyl," "lower alkoxy" and "lower alkanoyl" where used herein denote groups having 1–4 carbon atoms, preferably 1–2 carbon atoms. The term "lower alkylene" denotes groups having 2–4 carbon atoms, preferably 2 carbon atoms. The term "halogen" denotes chloro, bromo or fluoro.

Also, another object of this invention is the following process by which cyclobuta[c]quinolines are prepared:

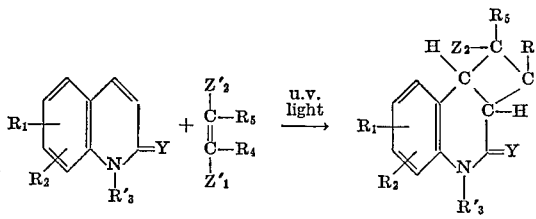

The terms Y, $R_1$, $R_2$, $R_3$, $R_4$ and $R_5$ are as defined above;

$R'_3$ is lower alkyl, di-lower alkylamino-lower alkylene, hydroxy- lower alkoxy or benzyl;

$Z'_1$ is hydrogen or

$Z'_2$ is hydrogen or

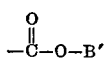

or, when $R_4$ and $R_5$ are hydrogen, $Z'_1$ and $Z'_2$, taken together with the carbon atoms to which they are attached, form a N-lower alkylmaleimide or a maleic anhydride ring;

B and B' are the same and are hydrogen or lower alkyl; and $Z_1$ and $Z_2$ correspond to $Z'_1$ and $Z'_2$ or, when $Z'_1$ and $Z'_2$ taken together with the carbon atom to which they are attached form a maleic anhydride ring, $Z_1$ and $Z_2$ are carboxy.

According to the above procedure, cyclobuta[c]-quinolines are prepared by the photochemical reaction of a carbostyril (or thiocarbostyril) of Formula III with an unsaturated compound of Formula IV. The reaction is preferably carried out in an inert solvent such as benzene, dioxane or dichloroethane, optionally containing as an activator a small amount of a simple ketone, such as acetone or benzophenone. The reaction mixture is irradiated with ultraviolet light for about 3–48 hours. The mixture is filtered and the cyclobuta[c]quinolines are obtained by concentrating the filtrate in vacuo.

When one or two carboxy substituents ($Z_1$ and $Z_2$) are present in compounds of Formlua V, the cyclobuta[c]-quinolines of Formula I are prepared therefrom by decarboxylating the carboxy groups, for example, by converting the carboxy groups to chlorocarbonyl groups, treating with t-butyl hydroperoxide, and heating the resulting t-butyl perester or by converting the carboxy groups to bromo substituents using red mercuric oxide and bromine and removing the bromo substituents by catalytic hydrogenation. When one or two lower alkoxycarbonyl groups or a N-lower alkylmaleimide ($Z_1$ and $Z_2$) are present in compounds of Formula V, the compounds are treated with sodium hydroxide in a lower alkanol to give the carboxy compounds and then decarboxylated as described above to give the compounds of Formula I.

To prepare cyclobuta[c]quinolines of this invention in which $R_3$ is hydrogen, the intermediates in which $R_3$ is benzyl are treated with a strong sulfur containing acid such as methane sulfonic acid at about 50–200° C. or, alternatively, the compounds in which $R_3$ is hydroxy are hydrogenated in the presence of a catalyst, for example, platinum in acetic acid or paladium-on-carbon in ethanol. When the latter method is used, the nitro substituted compounds of this invention in which $R_3$ is hydrogen are prepared by oxidizing the corresponding amino compounds.

The thio compounds of this invention, that is compounds of the above formulas in which Y is sulfur, are prepared by the above described methods, that is by photochemical reaction of a thiocarbostyril with an unsaturated compound, or, alternatively, by treating the corresponding oxo compounds of this invention with phosphorus pentasulfide.

The carbostyril and thiocarbostyril starting materials are prepared by methods known to the art, for example, as described in U.S. 3,141,888.

The unsaturated compounds of Formula IV which are starting materials for the compounds of this invention are either known to the art or are prepared by known methods such as those described herebelow in the examples.

The compounds of this invention all have the cyclobuta [c]quinoline ring system as a fundamental structural feature. The $R_1$, $R_2$ and $R_3$ substituents on the quinoline ring of the pharmacodynamically active compounds of Formula I are all known as substituents on the quinoline nucleus of pharmacologically active compounds as shown by British Patent 1,002,665 and United States Patent 3,141,888. From the disclosure in these patents that the compounds thereof, having an optionally substituted quinoline ring, have pharmacodynamic activity, the use of the compounds of Formula I of the present invention as pharmacodynamic agents is apparent to one skilled in the art.

The compounds of Formula I may be administered internally in conventional dosage forms by incorporating an appropriate dose of the compound with pharmaceutical carriers according to accepted pharmaceutical practices.

The following examples are not limiting but are illustrative of the compounds and the process of this invention.

Example 1

To 10 g. of 1-methyl-6-trifluoromethylcarbostyril dissolved in 500 cc. of dry benzene is added 3 ml. of dry acetone. Ethylene is bubbled through the solution, to saturate it. Then the solution is irradiated using a 200 watt medium pressure ultraviolet lamp while a steady stream of ethylene is kept flowing through the solution for 48 hours.

The mixture is filtered. The filtrate is concentrated and then stirred with cold isopropyl ether and filtered. The filtrate is concentrated and dissolved in petroleum ether, decanted from a small amount of solid, concentrated and distilled at 94° C. (0.05 mm.). This material is sublimed to give 1,2,2a,8b-tetrahydro-4-methyl-7-trifluoromethylcyclobuta[c]quinolin-3(4H)-one, M.P. 40.5–43° C.

Example 2

Ten grams of 1-methyl-6-trifluoromethylcarbostyril is dissolved in about 400 cc. of dry dioxane and 3 ml. of dry acetone and 6.4 ml. of acrylic acid are added. Nitrogen is passed through the solution while it is irradiated with a 200 watt medium pressure ultraviolet lamp for 16 hours.

The solution is concentrated to half volume and a small amount of sodium hydrosulfite dissolved in water is added. The mixture is concentrated to dryness, then the residue is triturated with methylene chloride and filtered. The filtrate is extracted with 5% sodium bicarbonate and the aqueous layer is made acidic with hydrochloric acid and filtered to give a mixture of 1-carboxy-1,2,2a,8b-tetrahydro-4-methyl - 7 - trifluoromethylcyclobuta[c]quinolin - 3 (4H)-one and 2-carboxy-1,2,2a,8b-tetrahydro-4-methyl-7-trifluoromethylcyclobuta[c]quinolin-3-(4H)-one. The isomers are separated by recrystallizing from isopropyl ether.

Three grams of the above prepared 1-carboxy compound in 25 ml. of chloroform is stirred with 5 g. of thionyl chloride at room temperature for five hours. Volatile materials are removed in vacuo and the residue is treated with 1.0 g. of t-butyl hydroperoxide and 1 ml. of pyridine in 50 ml. of anhydrous ether to give the t-butyl peroxy ester. The crude ester is heated at 150° C. in 50 ml. of cumene to give, after concentrating and distilling, 1,2,2a,8b-tetrahydro-4-methyl-7-trifluoromethylcyclobuta[c]quinolin - 3 (4H)-one. In the same manner, this product is prepared from the 2-carboxy compound or a mixture of the 1-carboxy and 2-carboxy isomers.

Example 3

Ethyl acrylate (9.5 ml.) is added to a solution of 10 g. of 1-methyl-6-trifluoromethylcarbostyril and 3 g. of benzophenone in 200 ml. of ethylene dichloride. The solution is irradiated overnight using an ultraviolet lamp, then filtered. The filtrate is concentrated to dryness. The residue is dissolved in benzene and the resulting benzene solution is chromatographed on an alumina column to give a mixture of 1-carbethoxy-1,2,2a,8b-tetrahydro-4-methyl - 7 - trifluoromethylcyclobuta[c]quinolin-3(4H)-one and 2-carbethoxy-1,2,2a,8b-tetrahydro-4-methyl-7-trifluoromethylcyclobuta[c]quinolin - 3(4H) - one. The isomers are separated by recrystallizing from hexane.

A mixture of two grams of 1-carbethoxy-1,2,2a,8b-tetrahydro - 4 - methyl - 7 - trifluoromethylcyclobuta[c]quinolin-3(4H)-one, 2 g. of sodium hydroxide and 50 ml. of ethanol is stirred at room temperature for 24 hours. The mixture is filtered. The filtrate is concentrated; the residue is dissolved in water, acidified with hydrochloric acid, allowed to stand at room temperature, then filtered to give 1-carboxy - 1,2,2a,8b - tetrahydro-4-methyl-7-trifluoromethylcyclobuta[c]quinolin-(4H)-one. Decarboxylation of this 1-carboxy compound by the procedure of Example 2 gives 1,2,2a,8b-tetrahydro-4-methyl-7-trifluoromethylcyclobuta[c]quinolin-3(4H)-one.

Example 4

A mixture of 10 g. of 1-methyl-6-trifluoromethylcarbostyril, 3 ml. of acetone and 15 g. of ethyl maleate is dissolved in 450 ml. of dioxane, flushed with nitrogen and irradiated overnight with a 200 watt medium pressure ultraviolet lamp. The solution is concentrated to dryness and the residue is stirred with boiling ether and filtered. The filtrate is concentrated to dryness and the residue is molecularly distilled to give 1,2-dicarbethoxy-1,2,2a,8b-tetrahydro - 4 - methyl - 7 - trifluoromethylcyclobuta[c]quinolin-3(4H)-one which is recrystallized from isopropyl ether. Saponifying the ester groups as in Example 3 and decarboxylating as in Example 2 gives 1,2,2a,8b-tetrahydro - 4 - methyl - 7 - trifluoromethylcyclobuta[c]quinolin-3(4H)-one.

Example 5

A mixture of 5 g. of 1-methyl-6-trifluoromethylcarbostyril, 5.65 g. of N-methylmaleimide and 2 g. of benzophenone is dissolved in 200 ml. of dichloroethane and irradiated overnight with an ultraviolet lamp. The mixture is filtered, the filtrate is concentrated and the residue is washed twice with petroleum ether, then recrystallized from acetone, from chloro-isopropyl ether and then from benzene-cyclohexane to give the N-methylimide of 1,2-dicarboxy - 1,2,2a,8b - tetrahydro-4-methyl-7-trifluoromethylcyclobuta[c]quinolin-3(4H)-one.

A suspension of 5 g. of the above prepared N-methylimide in 25 ml. of 25% potassium hydroxide is stirred for four hours. Water is added and the solution is chilled and acidified with hydrochloric acid. The solid material is filtered off and heated for one hour with concentrated hydrochloric acid to give 1,2-dicarboxy-1,2,2a,8b-tetrahydro - 4 - methyl - 7 - trifluoromethylcyclobuta[c]quinolin 3(4H)-one.

Decarboxylating as in Example 3 gives 1,2,2a,8b-tetrahydro - 4 - methyl - 7 - trifluoromethylcyclobuta[c]quinolin-3(4H)-one.

Example 6

A solution of 5 g. of 1-methyl-6-trifluoromethylcarbostyril and 5 g. of maleic anhydride in 200 ml. of benzene is irradiated with an ultraviolet lamp for two days. The mixture is filtered and the solid is heated with acetone. The insoluble material is filtered off and then the filtrate is concentrated to a small volume and chilled. Water is added and the resulting precipitate is filtered off and recrystallized from acetone-chloroform to give 1,2-dicarboxy - 1,2,2a,8b - tetrahydro - 4 - methyl-7-trifluoromethylcyclobuta[c]quinolin-3(4H)-one. Decarboxylation by the method of Example 2 gives 1,2,2a,8b-tetrahydro-4-methyl - 7 - trifluoromethylcyclobuta[c]quinolin-3(4H)-one.

Example 7

By the procedure of Example 1, ethylene is bubbled through a solution of 5 g. of 1-benzyl-6-chlorocarbostyril in 250 ml. of dry benzene and 2 ml. of dry acetone while the solution is irradiated with a 200 watt ultraviolet lamp. Working up as in Example 1 gives 4-benzyl-7-chloro-1,2,2a,8b-tetrahydrocyclobuta[c]quinolin-3(4H)-one.

Two grams of the above prepared 4-benzyl compound is added to 15 ml. of methane sulfonic acid at 120° C. The mixture is heated at about 120° C. for one hour, then poured into ice water. The aqueous mixture is made basic with 10% sodium hydroxide solution and extracted with ethyl acetate. The extracts are concentrated and distilled to give 7-chloro-1,2,2a,8b-tetrahydrocyclobuta[c]quinolin-3(4H)-one.

Example 8

Using, in place of 1-methyl-6-trifluoromethylcarbostyril, the following in the procedure of Example 1:

N-methylcarbostyril
1-methyl-6,7-methylenedioxycarbostyril
6-bromo-1-methylcarbostyril
1-methyl-6-nitrocarbostyril
6-acetamido-1-methylcarbostyril
1-methyl-6-methylaminocarbostyril
1-methyl-6-dimethylaminocarbostyril
6-methoxycarbonyl-1-methylcarbostyril
1-methyl-6-sulfamoylcarbostyril
5,7-dichloro-1-methylcarbostyril
1,7-dimethylcarbostyril
6-carbamoyl-1-methylcarbostyril
8-chloro-1-methylcarbostyril
6-methoxy-1-methylcarbostyril
6,7-dimethoxy-1-methylcarbostyril
1-(2-dimethylaminoethyl)carbostyril
1-ethoxycarbostyril
1-methoxycarbostyril and
1-hydroxycarbostyril the following products are obtained, respectively:

1,2,2a,8b-tetrahydro-4-methylcyclobuta[c]-quinolin-3(4H)-one
1,2,2a,8b-tetrahydro-4-methyl-6,7-methylenedioxycyclobuta[c]quinolin-3(4H)-one
7-bromo-1,2,2a,8b-tetrahydro-4-methylcyclobuta[c]quinolin-3(4H)-one
1,2,2a,8b-tetrahydro-4-methyl-7-nitrocyclobuta[c]quinolin-3(4H)-one
7-acetamido-1,2,2a,8b-tetrahydro-4-methylcyclobuta[c]quinolin-3(4H)-one
1,2,2a,8b-tetrahydro-4-methyl-7-methylaminocyclobuta[c]quinolin-3(4H)-one
1,2,2a,8b-tetrahydro-4-methyl-7-dimethylaminocyclobuta[c]quinolin-3(4H)-one
1,2,2a,8b-tetrahydro-7-methoxycarbonyl-4-methylcyclobuta[c]quinolin-3(4H)-one
1,2,2a,8b-tetrahydro-4-methyl-7-sulfamoylcyclobuta[c]quinolin-3(4H)-one
6,8-dichloro-1,2,2a,8b-tetrahydro-4-methylcyclobuta[c]quinolin-3(4H)-one
1,2,2a,8b-tetrahydro-4,6-dimethylcyclobuta[c]quinolin-3(4H)-one
7-carbamoyl-1,2,2a,8b-tetrahydro-4-methylcyclobuta[c]quinolin-3(4H)-one
5-chloro-1,2,2a,8b-tetrahydro-4-methylcyclobuta[c]quinolin-3(4H)-one
1,2,2a,8b-tetrahydro-7-methoxy-4-methylcyclobuta[c]quinolin-3(4H)-one
1,2,2a,8b-tetrahydro-6,7-dimethoxy-4-methylcyclobuta[c]quinolin-3(4H)-one
4-(2-dimethylaminoethyl)-1,2,2a,8b-tetrahydrocyclobuta[c]quinoline-3(4H)-one
4-ethoxy-1,2,2a,8b-tetrahydro-4-methylcyclobuta[c]quinolin-3(4H)-one 1,2,2a,8b-tetrahydro-4-methoxycyclobuta[c]quinolin-3(4H)-one and
1,2,2a,8b-tetrahydro-4-hydroxycyclobuta[c]quinolin-3(4H)-one.

Example 9

Hydrogenation of 1-methyl-6-nitrocarbostyril in ethanol containing Raney nickel gives, after filtering and removing the solvent in vacuo, 6-amino-1-methylcarbostyril which, by the procedure of Example 1, is reacted with ethylene to give 7-amino-1,2,2a,8b-tetrahydro-4-methylcyclobuta[c]quinolin-3(4H)-one.

Example 10

Refluxing 1-methyl-6-methoxycarbostyril with hydrobromic acid in acetic acid for four hours, concentrating in vacuo and recrystallizing the residue gives 1-methyl-6-hydroxycarbostyril. By the product of Example 1, this carbostyril is reacted with ethylene to give 1,2,2a,8b-tetrahydro - 7-hydroxy-4-methylcyclobuta[c]quinolin-3(4H)-one. Similarly, 1-methyl-6,7-dihydroxycarbostyril is obtained from 1-methyl-6,7-dimethoxycarbostyril and reacted with ethylene to give 1,2,2a,8b-tetrahydro-6,7-dihydroxy-4-methylcyclobuta[c]quinolin-3(4H)-one.

Example 11

Refluxing an ethanol solution of the 1-methyl-6-methoxycarbonylcarbostyril with an excess of 10% sodium hydroxide solution, extracting with ether and evaporating the ether in vacuo gives 1-methyl-6-carboxycarbostyril which by the procedure of Example 1, is reacted with ethylene to give 7-carboxy-1,2,2a,8b-tetrahydro-4-methylcyclobuta[c]quinolin-3(4H)-one.

Example 12

To 2.55 g. of 1,2,2a,8b-tetrahydro-4-methyl-7-trifluoromethylcyclobuta[c]quinolin-3(4H)-one (prepared as in Example 1) in 75 ml. of dioxane is added 2.22 g. of phosphorus pentasulfide. The resulting mixture is heated at reflux for one hour, then poured onto ice and extracted with chloroform and methylene chloride. The organic layer is extracted with water, dried, filtered and concentrated to give 1,2,2a,8b-tetrahydro-4-methyl-7-trifluoromethylcyclobuta[c]quinolin-3(4H)-thione.

Example 13

To 10 g. of 1-methyl-6-trifluoromethylcarbostyril dissolved in 450 ml. of dry dioxane, 3 ml. of dry acetone and 5.98 g. of cyclopentene are added. The resulting solution is flushed with nitrogen and irradiated overnight with a 200 watt medium pressure ultraviolet lamp while a steady stream of nitrogen is maintained. The mixture is filtered and the filtrate is concentrated to dryness. The residue is boiled with isopropyl ether and filtered. The filtrate is concentrated to dryness and the residue is dissolved in a small amount of carbon tetrachloride and chromatographed on a column of alumina (500 g. using carbon tetrachloride. Recrystallizing the product from hexane gives 2,3,3a,3b,9b,9c - hexahydro-5-methyl-8-trifluoromethyl - 1H-cyclopental[3,4] cyclobuta[1,2]quinolin-4(5H)-one having the following structural formula:

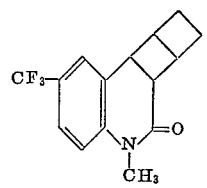

Example 14

A mixture of 10 g. of 1-methyl-6-trifluoromethylcarbostyril, 3 ml. of acetone and 8.5 g. of 1,2,3,6-tetrahydro-1-methylpyridine in 450 ml. of dioxane is flushed with nitrogen and irradiated with a 450 watt medium pressure ultraviolet lamp overnight. The solution is then concentrated to dryness in vacuo and the residue is stirred with ether and filtered. The ether filtrate is extracted with dilute hydrochloric acid. The acid extracts are made basic with sodium hydroxide. Extracting with ether and then drying, concentrating and molecularly distilling the extracts gives 1,2,3,4,4a,4b,10b,10c-octahydro-3,6-dimethyl-9 - trifluoromethylpyrido[4,3 - c]cyclobuta[1,2-c]quinolin-5(6H)-one and 1,2,3,4,4a,4b,10b,10c-octahydro-2,6-dimethyl - 9 - trifluoromethylpyrido[3,4-c]cyclobuta[1,2-c]quinolin-5-(6H)-one, the latter having the following structural formula:

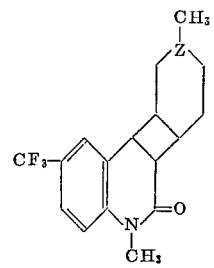

These isomers are separated by chromatography using carbon tetrachloride as solvent.

Example 15

A solution of 10 g. of 1-methyl-6-trifluoromethylcarbostyril, 3 ml. of acetone and 13.6 g. of the methyl ester of 1,2,5,6-tetrahydro-1-methylpyridine-3-carboxylic acid dissolved in 450 ml. of dioxane is flushed with nitrogen and irradiated overnight using a 200 watt medium pressure ultraviolet lamp. The solution is concentrated in vacuo and the residue is boiled with isopropyl ether. The ether mixture is filtered and the filtrate is concentrated to dryness. The residue is taken up in ethyl acetate and extracted with dilute hydrochloric acid. The acidic solution is made basic with sodium hydroxide. The solid material is isolated by filtration to give 1,2,3,4,4a,4b,10b,10c - octahydro - 4a - methoxycarbonyl - 3,6 - dimethyl-9 - trifluoromethylpyrido[4,3 - c]cyclobuta[1,2 - c] - quinolin-5(6H)-one and 1,2,3,4,4a,4b,10b,10c-octahydro-10c-methoxycarbonyl - 2,6 - dimethyl - 9 - trifluoromethylpyrido[3,4 - c] - cyclobuta[1,2 - c]quinolin - 5(6H) - one, the latter having the following structural formula:

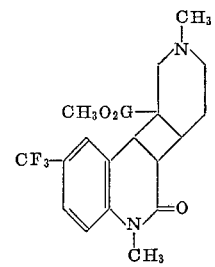

These isomers are separated by recrystallization from isopropyl ether.

Saponifying the ester groups by the procedure of Example 3 and decarboxylating as in Example 2 gives 1,2,3,4,4a,4b,10b,10c - octahydro - 3,6 - dimethyl - 9 - trifluoromethylpyrido[4,3 - c]cyclobuta[1,2 - c]quinolin-5(6H)-one and 1,2,3,4,4a,4b,10b,10c - octahydro - 2,6 - dimethyl - 9 - trifluoromethylpyrido[3,4 - c] - cyclobuta[1,2-c]quinolin-5(6H)-one.

By the same procedure, reacting 1-ethyl-thiocarbostyril with methyl 1,2,5,6-tetrahydro-1-methylpyridine-3-carboxylate the intermediates 6-ethyl-1,2,3,4,4a,4b,10b, 10c - octahydro - 4a - methoxycarbonyl - 3 - methylpyrido[4,3-c]cyclobuta[1,2-c]quinolin-5(6H)-thione and 6 - ethyl - 1,2,3,4,4a,4b,10b,10c - octahydro-10c-methoxycarbonyl - 2 - methylpyrido[3,4 - c]cyclobuta[1,2 - c]-quinolin-5(6H)-thione are obtained. Saponifying the ester groups and decarboxylating gives 6-ethyl-1,2,3,4,4a,4b, 10b,10c - octahydro - 3 - methylpyrido[4,3 - c]cyclobuta-

[1,2-c]-quinolin-5(6H)-thione and 6-ethyl-1,2,3,4,4a,4b,10b,10c - octahydro - 2 - methylpyrido[3,4 - c]cyclobuta-[1,2-c]quinolin-5(6H)-thione.

Example 16

By the procedure of Example 13, 1-propylcarbostyril is reacted with cyclohexene to give 1,2,3,4,4a,4b,10b,10c-octahydro - 6 - propylcyclohexa[3,4]cyclobuta[1,2 - c]-quinolin-5(6H)-one.

Example 17

By the procedure of Example 14, N-methylcarbostyril is reacted with each of the following:

1-methyl-3-pyrroline
1,2,3,4-tetrahydro-1-methylpyridine
1,2,3,6-tetrahydro-1-propylpyridine to give the following products, respectively:

2,3,3a,3b,9b,9c-hexahydro-2,5-dimethyl-1H-pyrrolo-[3,4-c]cyclobuta[1,2-c]quinolin-4(5H)-one
1,2,3,4,4a,4b,10b,10c-octahydro-4,6-dimethylpyrido-[3,2-c]cyclobuta[1,2-c]quinolin-5(6H)-one and 1,2,3,4,4a,4b,10b,10c-octahydro-1,6-dimethylpyrido[2,3-c]-cyclobuta[1,2-c]quinolin-5(6H)-one
1,2,3,4a,4b,10b,10c-octahydro-6-methyl-3-propylpyrido-[4,3-c]cyclobuta[1,2-c]quinolin-5(6H)-one and 1,2,3,4 4a,4b,10b,10c-octahydro-6-methyl-2-propylpyrido-[3,4-c]cyclobuta[1,2-c]quinolin-5(6H)-one.

Example 18

A mixture of 6.9 g. of 2-pyrroline and 13.7 g. of butyl bromide in ethyl ether is heated on a steam bath for four hours. The solvent is removed in vacuo and the residue is 1-butyl-2-pyrroline.

By the procedure of Example 14, 1-butyl-2-pyrroline is reacted with 1-methyl-6-trifluoromethylcarbostyril to give 3 - butyl - 2,3,3a,3b,9b,9c - hexahydro - 5 - methyl - 8 - trifluoromethyl - 1H - pyrrolo[3,2 - c]cyclobuta[1,2 - c]-quinolin - 4(5H) - one and 1 - butyl-2,3,3a,3b,9b,9c-hexahydro - 5 - methyl - 8 - trifluoromethyl - 1H - pyrrolo-[2,3-c]cyclobuta[1,2-c]quinolin-5(6H)-one.

Example 19

1-methyl-2-pyrroline-2-carboxylic acid is prepared by reacting 1-methyl-2-pyrrolidinone with methyl magnesium bromide in ether, dehydrating the resulting 2-hydroxy-1,2-dimethylpyrrolidinone and oxidizing the 2-methyl group of the resulting 1,2-dimethyl-2-pyrroline with potassium permanganate in aqueous acetone.

The reaction of methyl-2-pyrroline-2-carboxylic acid with N-methylcarbostyril by the procedure of Example 14 gives 3a - carboxy - 2,3,3a,3b,9b,9c - hexahydro-3,5-dimethyl - 1H - pyrrolo[3,2 - c]cyclobuta[1,2 - c]quinolin-5(6H) - one and 9c - carboxy - 2,3,3a,3b,9b,9c-hexahydro-1,5 - dimethyl - 1H - pyrrolo[2,3 - c]cyclobuta[1,2 - c]-quinolin - 5(6H) - one. The 3a - carboxy and 9c-carboxy groups of the above intermediates are removed by the procedure of Example 2 to give the corresponding des 3a-carboxy and des 9c-carboxy products.

By the same procedure 1-methyl-2-pyrroline-2,3-dicarboxylic acid is prepared from 1,3-dimethyl-2-pyrrolidinone and reacted with N-methylcarbostyril to give 3a,9c-dicarboxy-2,3,3a,3b,9b,9c-hexahydro-3,5-dimethyl-1H-pyrrolo-[3,2 - c]cyclobuta[1,2 - c]quinolin-5(6H)-one and 3a,9c-dicarboxy - 2,3,3a,3b,9b,9c - hexahydro-1,5-dimethyl-1H-pyrrolo[2,3 - c]cyclobuta[1,2-c]quinolin-5(6H)-one. The 3a- and 9c-carboxy groups are removed from these intermediates by the procedure of Example 2 to give the corresponding des 3a,9c-dicarboxy products.

Example 20

To a solution of 10.7 g. of the methyl ester of 1-butyl-4-oxopiperidine-3-carboxylic acid in benzene at 10° C. is added 3 g. of anhydrous hydrogen cyanide. The solution is stirred for 10 hours to give, after concentrating in vacuo, the methyl ester of 1-butyl-4-cyano-4-hydroxypiperidine-3-carboxylic acid which is dehydrated by heating in toluene for 18 hours with a catalytic amount of toluenesulfonic acid to give methyl 1-butyl-4-cyano-1,2,5,6-tetrahydropyridine-3-carboxylate. Heating this intermediate with dilute hydrochloric acid on a steam bath for 24 hours, then concentrating, adding an excess of sodium hydroxide in ethanol to saponify any unhydrolyzed ester by the procedure of Example 3 gives 1-butyl-1,2,5,6-tetrahydropyridine-3,4-dicarboxylic acid.

The above prepared tetrahydropyridine compound is reacted with 1-benzyl-6-chlorocarbostyril by the procedure of Example 1 to give 6-benzyl-3-butyl-9-chloro-1,2,3,4, 4a,4b,10b,10c - octahydropyrido[4,3-c]cyclobuta[1,2 - c] quinolin-5(6H)-one and 6 - benzyl - 2 - butyl - 9 - chloro-1,2,3,4,4a,4b,10b,10c - octahydropyrido[3,4 - c]cyclobuta [1,2-c]quinolin-5(6H)-one.

Debenzylating by the procedure of Example 7 gives 3-butyl - 9 - chloro - 1,2,3,4,4a,4b,10b,10c - octahydro-pyrido[4,3-c] - cyclobuta[1,2 - c]quinolin - 5(6H) - one and 2 - butyl - 9 - chloro - 1,2,3,4,4a,4b,10b,10c - octahydropyrido[3,4-c]cyclobuta-[1,2-c]quinolin-5(6H)-one.

Example 21

Methyl 1-ethyl-3-pyrroline-3,4-dicarboxylate (prepared by catalytic hydrogenation of 1-ethylpyrrole-3,4-dicarboxylic acid) is reacted with N-methylcarbostyril by the procedure of Example 15 to give 2-ethyl-2,3,3a,3b,9b,9c-hexahydro-3a,9c-dimethoxycarbonyl-5-methyl - 1H - pyrrolo-[3,4-c]cyclobuta[1,2-c]quinolin-4(5H)-one. Saponifying by the procedure of Example 3 and decarboxylating as in Example 2 gives 2-ethyl-2,3,3a,3b,9b,9c-hexahydro-5 - methyl - 1H - pyrrolo - [3,4-c]cyclobuta[1,2-c]quinolin-4(5H)-one.

Similarly, reacting methyl 1-propylpyrroline-3-carboxylate (prepared by treating methyl pyrrole-3-carboxylate with propyl bromide in ethanol and hydrogenating the resulting methyl 1-propylpyrrole-3-carboxylate in the presence of a palladium catalyst) with 1-methyl-6-trifluoromethylcarbostyril gives 2,3,3a,3b,9b,9c - hexahydro - 3a-methoxycarbonyl - 5 - methyl - 2 - propyl - 8 - trifluoromethyl - 1H - pyrrolo[3,4 - c]cyclobuta[1,2 - c]-quinolin-4(5H)-one and the corresponding compound in which the methoxycarbonyl group is in the 9c-position instead of the 3a-position.

Saponifying and decarboxylating either of the above prepared isomers or a mixture of them gives 2,3,3a,3b,9b,9c-hexahydro - 5 - methyl - 2 - propyl - 8 - trifluoromethyl-1H - pyrrolo-[3,4-c]cyclobuta[1,2-c]quinolin-4(5H)-one.

What is claimed is:
1. A compound of the formula:

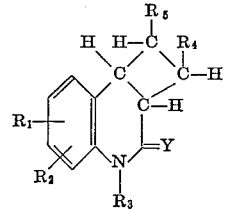

in which:
Y is oxygen or sulfur;
$R_1$ is hydrogen, halogen, trifluoromethyl, lower alkyl, alkoxy, hydroxy, lower alkoxycarbonyl, carboxy, carbamoyl or sulfamoyl;
$R_2$ is hydrogen, halogen, hydroxy, lower alkoxy or, when taken together with $R_1$ and when adjacent to $R_1$, methylenedioxy;
$R_3$ is hydrogen, lower alkyl, di-lower alkylamino-lower alkylene, hydroxy or lower alkoxy and
$R_4$ and $R_5$ are hydrogen or, taken together with the carbon atoms to which they are attached, form a cycloalkyl ring having 5–6 members or a saturated heterocyclic ring having 5–6 members of which one member is a nitrogen atom having a lower alkyl substituent and the other members are carbon.

2. A compound according to claim 1 in which $R_1$ is trifluoromethyl in the position para to the attachment of the nitrogen atom, $R_2$ is hydrogen, $R_3$ is methyl and $R_4$ and $R_5$ are hydrogen.

3. A compound according to claim 1 in which Y is oxygen, $R_1$ is trifluoromethyl in the position para to the attachment of the nitrogen atom, $R_2$ is hydrogen, $R_3$ is methyl and $R_4$ and $R_5$, taken together with the carbon atoms to which they are attached, form a cyclopentyl ring.

4. A compound of the formula:

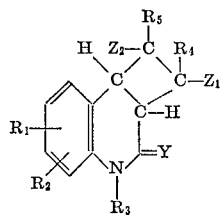

in which:
Y is oxygen or sulfur;
$R_1$ is hydrogen, halogen, trifluoromethyl, lower alkyl, lower alkoxy, hydroxy, lower alkoxycarbonyl, carboxy, carbamoyl or sulfamoyl;
$R_2$ is hydrogen, halogen, hydroxy, lower alkoxy or, when taken together with $R_1$ and when adjacent to $R_1$, methylenedioxy;
$R_3$ is hydrogen, lower alkyl, di-lower alkylamino-lower alkylene, hydroxy or lower alkoxy;
$R_4$ and $R_5$ are hydrogen or, taken together with the carbon atoms to which they are attached, form a cycloalkyl ring having 5–6 members or a saturated heterocyclic ring having 5–6 members of which one member is a nitrogen atom having a lower alkyl substituent and the other members are carbon;
$Z_1$ is hydrogen or

$Z_2$ is hydrogen or

or $Z_1$ and $Z_2$, taken together with the carbon atoms to which they are attached, form a N-lower alkyl-maleimide ring, at least one of $Z_1$ and $Z_2$ being other than hydrogen; and
B and B' are the same and are hydrogen or lower alkyl.

5. A compound of the formula:

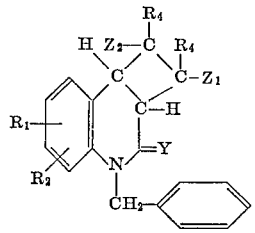

in which:
Y is oxygen or sulfur;
$R_1$ is hydrogen, halogen, trifluoromethyl, lower alkyl, lower alkoxy, hydroxy, lower alkoxycarbonyl, carboxy, carbamoyl or sulfamoyl;
$R_2$ is hydrogen, halogen, hydroxy, lower alkoxy or, when taken together with $R_1$ and when adjacent to $R_1$, methylenedioxy;
$R_4$ and $R_5$ are hydrogen or, taken together with the carbon atoms to which they are attached, form a cycloalkyl ring having 5–6 members or a saturated heterocyclic ring having 5–6 members of which one member is a nitrogen atom having a lower alkyl substituent and the other members are carbon;
$Z_1$ is hydrogen or

$Z_2$ is hydrogen or

or $Z_1$ and $Z_2$, taken together with the carbon atoms to which they are attached, form a N-lower alkyl-maleimide ring; and
B and B' are the same and are hydrogen or lower alkyl.

6. A process for the preparation of cyclobuta[c]-quinolines which comprises reacting, in the presence of ultraviolet light, a compound of the formula:

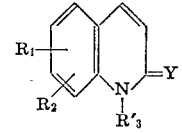

in which:
Y is oxygen or sulfur;
$R_1$ is hydrogen, halogen, trifluoromethyl, lower alkyl, lower alkoxy, hydroxy, lower alkoxycarbonyl, carboxy, carbamoyl or sulfamoyl;
$R_2$ is hydrogen, halogen, hydroxy, lower alkoxy or, when taken together with $R_1$ and when adjacent to $R_1$ methylenedioxy; and
$R'_3$ is lower alkyl, di-lower alkylamino-lower alkylene, hydroxy, lower alkoxy or benzyl
with an olefin of the formula:

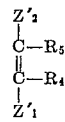

in which:
$R_4$ and $R_5$ are hydrogen or, taken together with the carbon atoms to which they are attached, form a cycloalkyl ring having 5–6 members or a saturated heterocyclic ring having 5–6 members of which one member is a nitrogen atom having a lower alkyl substituent and the other members are carbon;
$Z'_1$ is hydrogen or

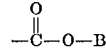

$Z'_2$ is hydrogen or

or, when $R_4$ and $R_5$ are hydrogen, $Z'_1$ and $Z'_2$, when taken together with the carbon atoms to which they are attached, form a N-lower alkylmaleimide or a maleic anhydride ring; and
B and B' are the same and are hydrogen or lower alkyl
to form a cyclobuta[c]quinoline of the formula:

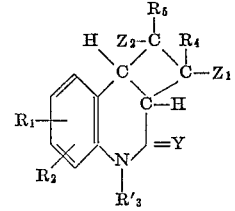

in which:
Y, $R_1$, $R_2$, $R_4$ and $R_5$ are as defined above;
$R'_3$ is lower alkyl, di-lower alkylamino-lower alkylene, hydroxy, lower alkoxy or benzyl and

13

$Z_1$ and $Z_2$ correspond to $Z'_1$ and $Z'_2$ or, when $Z'_1$ and $Z'_2$ taken together with the carbon atom to which they are attached form a maleic anhydride ring, $Z_1$ and $Z_2$ are carboxy.

7. The process according to claim 6 in which Y is oxygen, $R_1$ is trifluoromethyl in the position para to the attachment of the nitrogen atom, $R_2$ is hydrogen, $R_3$ is methyl and $R_4$ and $R_5$ are hydrogen.

References Cited

UNITED STATES PATENTS 3,005,823  10/1961  Kaeding ............ 260—287

14

1,141,888  7/1964  Loev ............... 260—289
3,300,502  1/1967  Seeger ............. 260—289

FOREIGN PATENTS 1,002,665  8/1965  Great Britain.

ALEX MAZEL, Primary Examiner

D. G. DAUS, Assistant Examiner

U.S. Cl. X.R.

204—158; 260—288, 289, 290, 294.7, 295, 313.1, 326.3, 326.8, 677, 690; 424—258